US011970394B2

(12) United States Patent
Jeon et al.

(10) Patent No.: US 11,970,394 B2
(45) Date of Patent: Apr. 30, 2024

(54) METHOD OF SYNTHESIZING APATITE POWDER USING LASER

(71) Applicant: KOREA INSTITUTE OF SCIENCE AND TECHNOLOGY, Seoul (KR)

(72) Inventors: Hojeong Jeon, Seoul (KR); Seung Hoon Um, Seoul (KR); Yu Chan Kim, Seoul (KR); Hyung-Seop Han, Seoul (KR); Myoung-Ryul Ok, Seoul (KR); Hyunseon Seo, Seoul (KR); Hyun Kwang Seok, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 666 days.

(21) Appl. No.: 17/130,536

(22) Filed: Dec. 22, 2020

(65) Prior Publication Data

US 2021/0309521 A1    Oct. 7, 2021

(30) Foreign Application Priority Data

Apr. 3, 2020  (KR) ........................ 10-2020-0040871

(51) Int. Cl.
  *C01B 25/32*  (2006.01)
  *B01J 19/12*  (2006.01)
  *B23K 26/122*  (2014.01)

(52) U.S. Cl.
  CPC .............. *C01B 25/32* (2013.01); *B01J 19/121* (2013.01); *B23K 26/122* (2013.01);
  (Continued)

(58) Field of Classification Search
  CPC ...... C01B 25/32; C01B 25/325; B01J 19/121; B01J 2219/0801; B23K 26/122;
  (Continued)

(56) References Cited

U.S. PATENT DOCUMENTS 11,434,570 B2 *  9/2022  Jeon ..................... B23K 26/122
2017/0056304 A1   3/2017  Friedemann et al.
2020/0071834 A1   3/2020  Jeon et al.

FOREIGN PATENT DOCUMENTS

JP    2005126335 A    5/2005
JP    2009057234 A    3/2009
(Continued)

OTHER PUBLICATIONS

Lee et al (A New Approach for Hydroxyapatite Coating on Polymeric Materials Using Laser-Induced Precursor Formation and Subsequent Aging, ACS Applied Materials and Interfaces, 2009) (Year: 2009).*

(Continued)

*Primary Examiner* — Samir Shah
*Assistant Examiner* — Logan Edward Laclair
(74) *Attorney, Agent, or Firm* — Rabin & Berdo, P.C.

(57) ABSTRACT

Provided is a method of synthesizing apatite powder by emitting a laser beam to a surface of a substrate immersed in a precursor solution. The method is including immersing a substrate in an apatite-forming precursor solution, emitting a laser beam to a region on a surface of the substrate immersed in the precursor solution, and obtaining apatite powder generated in the precursor solution.

11 Claims, 21 Drawing Sheets

(52) U.S. Cl.
CPC ... *B01J 2219/0801* (2013.01); *C01P 2002/01* (2013.01); *C01P 2004/03* (2013.01); *C01P 2004/04* (2013.01)

(58) Field of Classification Search
CPC .............. C01P 2002/01; C01P 2004/03; C01P 2004/04; C01P 2002/72; C01P 2004/01; C01P 2004/61; C01P 2006/80
See application file for complete search history.

(56) References Cited

FOREIGN PATENT DOCUMENTS

| | | |
|---|---|---|
| JP | 2012030993 A | 2/2012 |
| JP | 2015063444 A | 4/2015 |
| KR | 1020180034659 A | 4/2018 |
| KR | 1020200012496 A | 2/2020 |
| KR | 1020200026475 A | 3/2020 |

OTHER PUBLICATIONS

International Search Report in the counterpart International Patent Application No. PCT/KR2020/018333.
H. L. Jang et al., "Phase transformation from hydroxyapatite to the secondary bone mineral, whitlockite", Journal of Materials Chemistry B, pp. 1-8, Dec. 19, 2014.
Baek-Hee Lee et al, "A New Approach for Hydroxyapatite Coating on Polymeric Materials Using Laser-Induced Precursor Formation and Subsequent Aging". vol. 1 No. 7 • 1520-1524 • 2009.

* cited by examiner

METHOD OF SYNTHESIZING APATITE POWDER USING LASER

CROSS-REFERENCE TO RELATED APPLICATION

This application claims the benefit of Korean Patent Application No. 10-2020-0040871, filed on Apr. 3, 2020, in the Korean Intellectual Property Office, the disclosure of which is incorporated herein in its entirety by reference.

BACKGROUND

1. Field

The present invention relates to a method of synthesizing apatite powder using a laser, and more particularly, to a method of forming apatite powder by immersing a substrate in an apatite-forming precursor solution and emitting a laser beam thereto.

2. Description of the Related Art

Titanium-based alloys, as the most widely used metallic biomaterials for medical purposes, have been reported as superior materials to conventional biometals due to low modulus of elasticity, excellent biocompatibility, and high corrosion resistance.

However, due to bioinert properties, titanium-based alloys cannot directly induce osteogenesis and require a long treatment time to bond to adjacent bones, and a spontaneously formed titanium oxide coating is too thin to induce regeneration of adjacent bond tissue since the coating rapidly disappears.

Thus, bioactivity is imparted to an implant by surface treatment to solve these problems such as direct bonding failure between the implant and the bone and relaxation for reducing an implant-bone integration time. A healing time after an implant is placed in a human body may be reduced by further improving bioactivity via physical or chemical surface treatment on the surface of titanium, commonly used as a main material for implants. Research has been conducted into more effective surface treatment.

In this regard, hydroxyapatite has been used as a material applied to the surface of titanium for surface treatment. Hydroxyapatite is a basic component constituting hard tissue of the human body and has been used as a bone graft material or a bone regeneration material. Hydroxyapatite has a chemical structure of $Ca_{10}(PO_4)_6(OH)_2$ and is distributed in dental enamel of the human body mainly in the outermost enamel layer having a thickness of about 1 mm to 2 mm. Hydroxyapatite is known to have a remineralization effect of directly filling micropores of demineralized enamel.

In addition to the surface treatment of implants as described above, apatite is required to have components and particle sizes appropriate for each application field in order to provide characteristics suitable for use. Conventionally, solid-phase synthesis and hydrothermal synthesis have been used to prepare apatite having an acicular or planar particle shape. However, these conventional methods have various problems.

A problems of too large particle size of several micrometers arises due to heat treatment performed at a high temperature of about 800° C. to about 1200° C. and complicated post processing such as mixing, calcining, and pulverizing is required after reaction in the solid-phase synthesis, and thus the solid-phase synthesis cannot be an industrially advantageous method.

Meanwhile, the hydrothermal synthesis is a reaction performed using amorphous precipitate calcium phosphate in an autoclave at a temperature of about 150° C. to about 250° C. In the hydrothermal synthesis, a two-stage process including a precipitation process and a hydrothermal synthesis process is required, various additives need to be mixed, and the process is complicated, and thus it is not suitable for mass production.

SUMMARY

The present invention has been proposed to solve various problems including the above problems, and an object of the present invention is to provide a method of synthesizing apatite powder by emitting a laser beam to a surface of a substrate immersed in a precursor solution.

However, problems to be solved are illustrative and the scope of the present invention is not limited thereby.

Additional aspects will be set forth in part in the description which follows and, in part, will be apparent from the description, or may be learned by practice of the presented embodiments.

According to an aspect of the present invention to achieve the object, provided is a method of synthesizing apatite powder using a laser including (a) immersing a substrate in an apatite-forming precursor solution, (b) emitting a laser beam to a region on the substrate immersed in the precursor solution, and (c) obtaining apatite powder generated in the precursor solution.

Apatite powder represented by Formula 1 below may be synthesized in the step (c):

$$(M_1)_a(M_2)_{10-a}(ZO_4)_6(X)_2 \qquad \text{Formula 1}$$

wherein $M_1$ and $M_2$ are each independently selected from the group consisting of $Ca^{2+}$, $Pb^{2+}$, $Sr^{2+}$, $Mg^{2+}$, $Fe^{2+}$, $Mn^{2+}$, $Cd^{2+}$, $Ba^{2+}$, $Co^{2+}$, $Ni^{2+}$, $Cu^{2+}$, $Zn^{2+}$, $Sn^{2+}$, $Eu^{2+}$, $Na^+$, $K^+$, $Li^{30}$, $Rb^+$, $NH_4^+$, $La^{3+}$, $Ce^{3+}$, $Sm^{3+}$, $Eu^{3+}$, $Y^{3+}$, $Bi^{3+}$, $Cr^{3+}$, $Th^{4+}$, $U^{4+}$, and $U^{6+}$, $ZO_4$ is selected from the group consisting of $PO_4^{3-}$, $AsO_4^{3-}$, $SiO_4^{4-}$, $VO_4^{3-}$, $CrO_4^{3-}$, $CrO_4^{2-}$, $MnO_4^{3-}$, $SO_4^{2-}$, $SeO_4^{2-}$, $BeF_4^{2-}$, $GeO_4^{4-}$, $ReO_5^{3-}$, $SbO_{3F}^{4-}$, $SiON^{5-}$, $BO_4^{5-}$, $BO_3^{3-}$, and $CO_3^{2-}$, X is selected from the group consisting of $F^-$, $OH^-$, $C^-$, $O_2^-$, $O_3^-$, $NCO^-$, $BO_2^-$, $Br^-$, $I_-$, $NO_2^-$, $NO_3^-$, $CO_3^{2-}$, $O_2^{2-}$, $O^{2-}$, $S^{2-}$, $NCN^{2-}$, and $NO_2^{-2}$, and a is a real number from 0 to 10.

The precursor solution may be a solution in which $M_1$, $M_2$, and $ZO_4$ ions are dissolved in the step (a).

When the precursor solution includes $Ca^{2+}$ ions and $PO_4^{3-}$ ions, hydroxyapatite powder may be formed in the step (c).

When the precursor solution includes $Mg^{2+}$ ions, powder of one of hydroxyapatite, Mg-containing apatite, whitlockite, and any combination thereof may be formed in the step (c).

A size of the apatite powder may be adjusted by controlling a concentration of the precursor solution.

The step (b) may include adjusting a size of the generated apatite powder by controlling a laser irradiation time.

The step (b) may include adjusting a size of the generated apatite powder by controlling a power of the laser beam.

Components of the apatite powder may be adjusted by controlling components of the precursor solution. A $(M_1 + M_2)/ZO_4$ ratio of the apatite powder may be adjusted by controlling a concentration of the precursor solution.

Crystallinity of the apatite powder may be adjusted by controlling a power of the laser beam.

Crystallinity of the apatite powder may be adjusted by controlling a pulse width of the laser beam.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
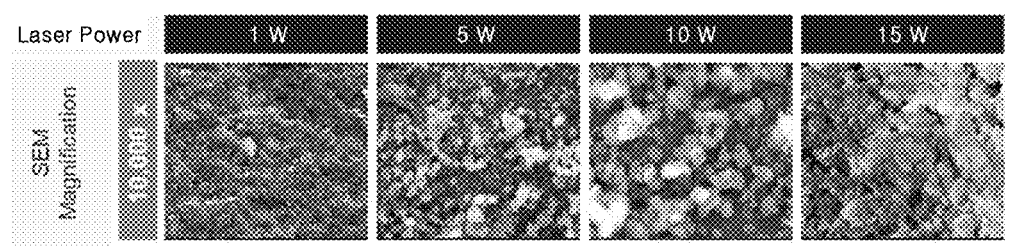
FIG. 1A shows SEM images of apatite powder formed according to power of laser beams according to an embodiment.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein, in connection with one embodiment, may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views and elements may be exaggerated for the convenience of description.

Hereinafter, embodiments of the present invention will be described in detail with reference to the appended drawings for one of ordinary skill in the art to be able to perform the invention without any difficulty.

A method of synthesizing apatite powder according to an embodiment of the present invention includes: (a) immersing a substrate in an apatite-forming precursor solution, (b) emitting a laser beam to a region on the substrate immersed in the precursor solution, and (c) obtaining apatite powder generated in the precursor solution.

The substrate may be formed of a material on which an apatite coating film is formed, e.g., a biometal. For example, the substrate may be formed of one selected from titanium, a titanium alloy, magnesium, and a magnesium alloy. Also, any metallic material or ceramic material on which an apatite coating film is formed may be used.

Since the present invention is characterized in that apatite powder including ions contained in the precursor solution is generated by laser irradiation, types of the ions contained in the precursor solution are not particularly limited. In an embodiment, the precursor solution, as a solution supplying raw materials for forming apatite, may include a cation selected from the group consisting of $Ca^{2+}$, $Pb^{2+}$, $Sr^{2+}$, $Mg^{2+}$, $Fe^{2+}$, $Mn^{2+}$, $Cd^{2+}$, $Ba^{2+}$, $Co^{2+}$, $Ni^{2+}$, $Cu^{2+}$, $Zn^{2+}$, $Sn^{2+}$, $Eu^{2+}$, $Na^+$, $K^+$, $Li^+$, $Rb^+$, $NH_4^+$, $La^{3+}$, $Ce^{3+}$, $Sm^{3+}$, $Eu^{3+}$, $Y^{3+}$, $Bi^{3+}$, $Cr^{3+}$, $Th^{4+}$, $U^{4+}$, and $U^{6+}$ and an anion selected from the group consisting of $PO_4^{3-}$, $AsO_4^{3-}$, $SiO_4^{-}$, $VO_4^{3-}$, $CrO_4^{3-}$, $CrO_4^{2-}$, $MnO_4^{3-}$, $SO_4^{2-}$, $SeO_4^{2-}$, $BeF_4^{2-}$, $GeO_4^{4-}$, $ReO_5^{3-}$, $SbO_3F^{4-}$, $SiON^{5-}$, $BO_4^{5-}$, $BO_3^{3-}$, and $CO_3^{2-}$. The precursor solution may further include an ion selected from the group consisting of $F^-$, $OH^-$, $Cl^-$, $O_2^-$, $O_3^-$, $NCO^-$, $BO_2^-$, $Br^-$, $I^-$, $NO_2^-$, $NO_3^-$, $CO_3^{2-}$, $O_2^{2-}$, $O^{2-}$, $S^{2-}$, $NCN^{2-}$, and $NO_2^{2-}$. When the precursor solution including the ions describe above, apatite powder represented by Formula 1 below may be synthesized in the precursor solution.

$$(M_1)_a(M_2)_{10-a}(ZO_4)_6(X)_2 \qquad \text{Formula 1}$$

In Formula 1, $M_1$ and $M_2$ are each independently selected from the group consisting of $Ca^{2+}$, $Pb^{2+}$, $Sr^{2+}$, $Mg^{2+}$, $Fe^{2+}$, $Mn^{2+}$, $Cd^{2+}$, $Ba^{2+}$, $Co^{2+}$, $Ni^{2+}$, $Cu^{2+}$, $Zn^{2+}$, $Sn^{2+}$, $Eu^{2+}$, $Na^+$, $K^+$, $Li^+$, $Rb^+$, $NH_4^+$, $La^{3+}$, $Ce^{3+}$, $Sm^{3+}$, $Eu^{3+}$, $Y^{3+}$, $Bi^{3+}$, $Cr^{3+}$, $Th^{4+}$, $U^{4+}$, and $U^{6+}$, $ZO_4$ is one selected from the group consisting of $PO_4^{3-}$, $AsO_4^{3-}$, $SiO_4^{4-}$, $VO_4^{3-}$, $CrO_4^{3-}$, $CrO_4^{2-}$, $MnO_4^{3-}$, $SO_4^{2-}$, $SeO_4^{2-}$, $BeF_4^{2-}$, $GeO_4^{4-}$, $ReO_5^{3-}$, $SbO_3F^{4-}$, $SiON^{5-}$, $BO_4^{5-}$, $BO_3^{3-}$, and $C_3^{2-}$, X is one selected from the group consisting of $F^-$, $OH^-$, $Cl^-$, $O_2^-$, $O_3^-$, $NCO^-$, $BO_2^-$, $Br^-$, $I^-$, $NO_2^-$, $NO_3^-$, $CO_3^{2-}$, $O_2^{2-}$, $O_2^{2-}$, $S^{2-}$, $NCN^{2-}$, and $NO_2^{2-}$, and a is a real number from 0 to 10. That is, apatite powder including ions dissolved in the precursor solution may be synthesized in the solution by the laser irradiation.

Hereinafter, the present invention will be described in more detail by describing a precursor solution including $Ca^{2+}$ ions and $PO_4^{3-}$ ions as an example of the apatite-forming precursor solution. For example, the precursor solution including $Ca^{2+}$ ions and $PO_4^{3-}$ ions may be selected from solutions including inorganic components of Dulbecco Modified Eagle Medium (DMEM), Hank's Balanced Salt Solution (HBSS), and Human blood plasma (HBP) and simulated body fluids (SBF). The precursor solution may be used by increasing the concentrations of $Ca^{2+}$ ions and $PO_4^{3-}$ ions by 1 to 400 times to promote formation of apatite. However, the present invention is not limited thereto, and any precursor solution may be used as long as the concentration of the precursor solution is adjustable according to the purpose of synthesis.

When a laser beam having high energy is emitted to the surface of the substrate immersed in the precursor solution, reactions of $Ca^{2+}$ ions and $PO_4^{3-}$ ions contained in the precursor solution are activated, thereby forming apatite powder. Later, a molded product thereof may be prepared by a method including separating the generated apatite powder from the solution and curing the apatite powder, or the like.

Conventional synthesis methods of apatite powder require solid-phase synthesis, liquid-phase synthesis, vapor-phase synthesis, hydrothermal synthesis, or the like which includes a complex process with high-temperature heat treatment. Unlike these conventional synthesis methods, according to an embodiment of the present invention, not only an apatite coating film is formed on the substrate but also apatite powder is generated in the solution by emitting a laser beam to a region on the substrate immersed in the precursor solution. After separating and drying the generated apatite powder, the apatite powder may be molded to various products with different shapes, thereby improving the degree of utilization.

As a laser generator as an energy source to supply energy for forming apatite, for example, an ytterbium nanosecond pulsed or femtosecond pulsed laser generator may be used. In this regard, the nanosecond pulsed laser refers to a laser having a pulse width of several nanoseconds, and the femtosecond pulsed laser refers to a laser having a very short pulse width of $10^{-15}$ seconds. However, the present invention is not limited thereto, and any laser capable of supplying sufficient energy to the precursor solution and generating apatite may also be used.

Particle size of the generated apatite powder may be modified by controlling the concentration of the precursor solution, conditions of the laser beam, e.g., power and irradiation time of the laser beam.

Components of the apatite powder may be modified by controlling components and concentration of the precursor solution. For example, when the precursor solution includes $Mg^{2+}$ ions, apatite powder including hydroxyapatite, Mg-containing apatite, whitlockite, or any combination thereof may be generated depending on the amount of $Mg^{2+}$ ions. As another example, a $(M_1+M_2)/ZO_4$ ratio of the apatite powder may be adjusted by controlling the concentration of the precursor solution.

According to an embodiment of the present invention, crystallinity of apatite powder may be adjusted by controlling laser irradiation conditions, e.g., power, pulse width, wavelength, pulse energy, pulse repetition rate, and irradiation time of the laser beam.

Hereinafter, the present invention will be described in more detail with reference to the following examples. However, these examples are made only for illustrative purposes, and the present invention is not be construed as being limited to those examples.

EXAMPLE

A titanium substrate or a magnesium substrate was used. DMEM concentrated to 100 to 400 times was added to a precursor solution container provided on a PDMS mold to which the substrate was fixed. Subsequently, a laser beam was emitted onto the surface of the substrate using an ytterbium nanosecond pulsed fiber laser to form apatite powder. A power of the laser beam was selected from a range of 1 W to 15 W and irradiation time was selected from a range of 15 minutes to 30 minutes.

Experimental Example

Figure 1B:
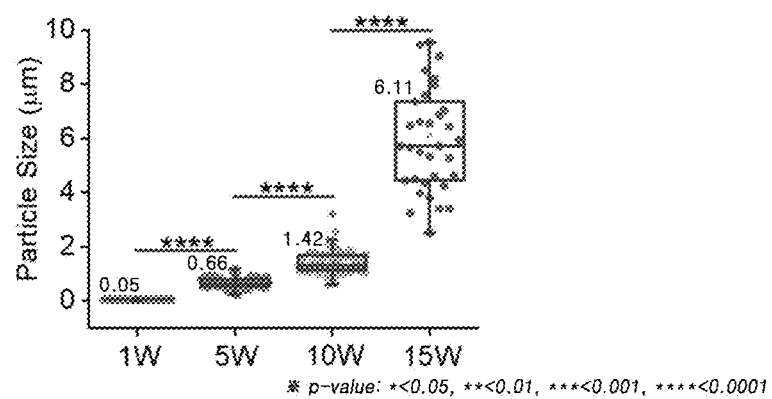
FIG. 1B shows sizes of apatite powder formed according to power of laser beams according to an embodiment.

FIG. 1A and FIG. 1B show SEM images and particle size analysis results of synthesized apatite powder according to power of laser beams, respectively, and it may be confirmed that the particle size of the powder is in the range of about 50 nm to about 6000 nm at a power of 1 W to 15 W. It is confirmed that the particle size of apatite powder increases as the laser irradiation energy increases.

Figure 2:
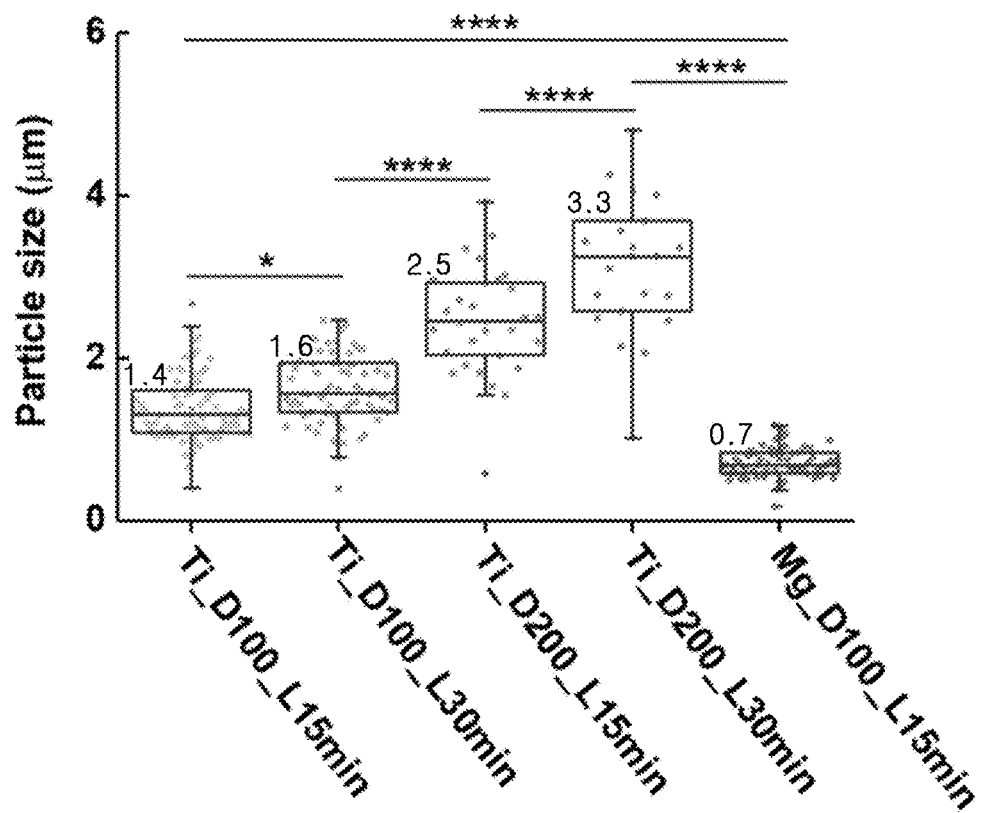
FIG. 2 is a graph illustrating sizes of apatite formed according to concentration of a precursor solution and laser irradiation time according to an embodiment.

FIG. 2 is a graph illustrating particle sizes of generated apatite powder according to concentration of a precursor solution and laser irradiation time. It is confirmed that the particle size of the apatite powder increases as the concentration of the precursor solution increases and as the laser irradiation time increases. The apatite powder formed on the magnesium substrate by laser irradiation had smaller particle sizes than that formed on the titanium substrate. Based thereon, it is expected that the degree of temperature rise varies according to the substrate although the laser beam with the same energy is emitted thereto.

Figure 3:
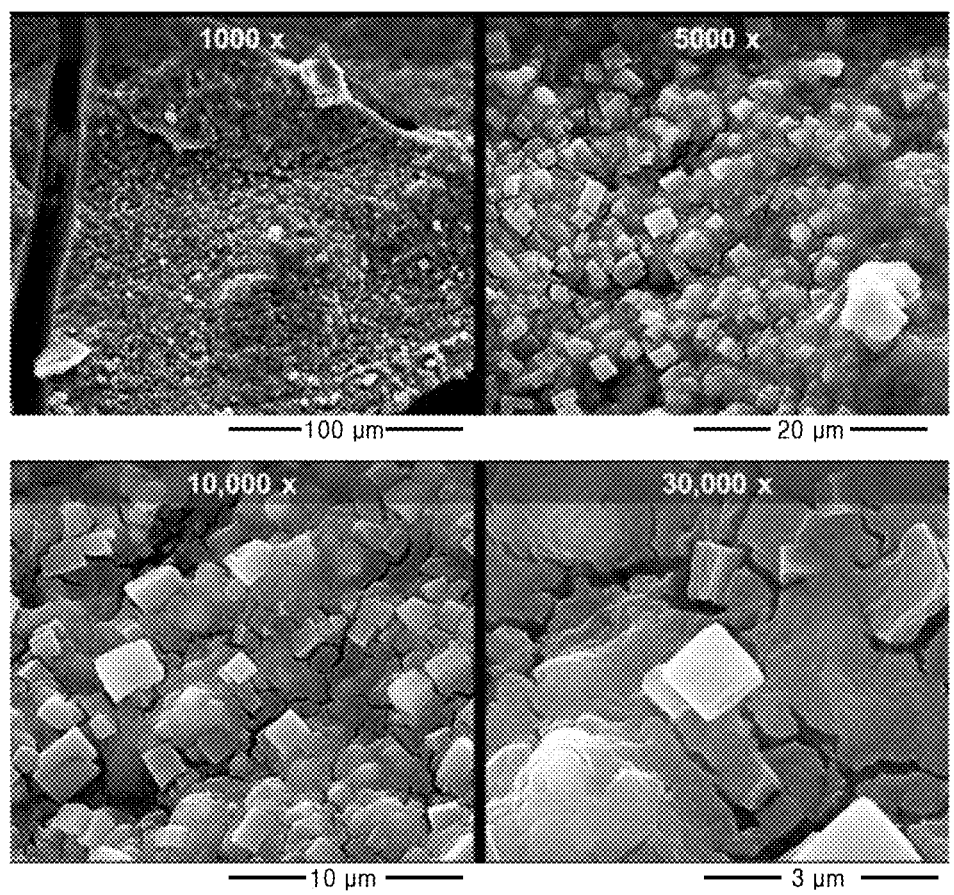
FIG. 3 shows SEM images of whitlockite crystals generated according to an embodiment.

FIG. 3 shows scanning electron microscope (SEM) images of whitlockite crystals generated from a Mg ion-containing precursor solution. Based thereon, it is confirmed that apatite crystals are generated by using a laser.

Figure 4A:
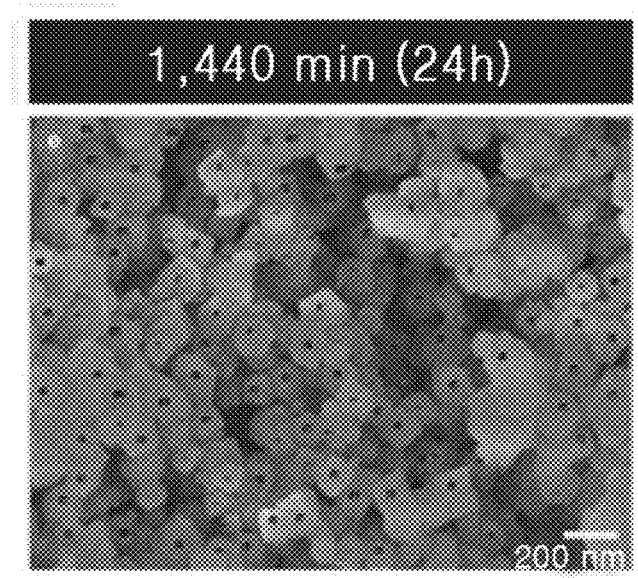
FIGS. 4A to 4C show SEM images of apatite crystals generated according to an embodiment and a comparative example.
Figure 4B:
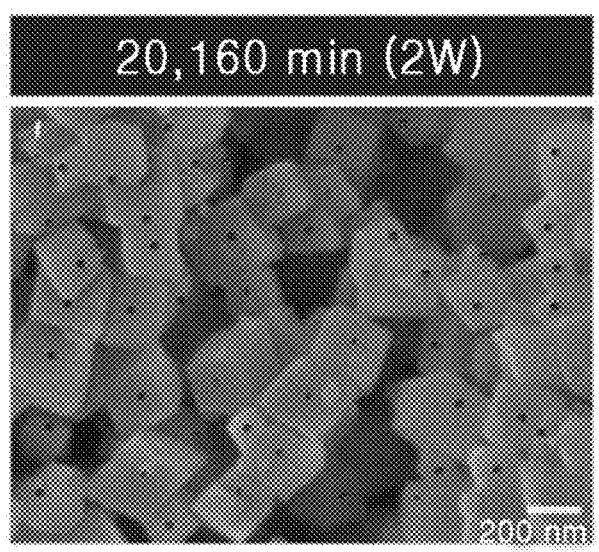
Figure 4C:
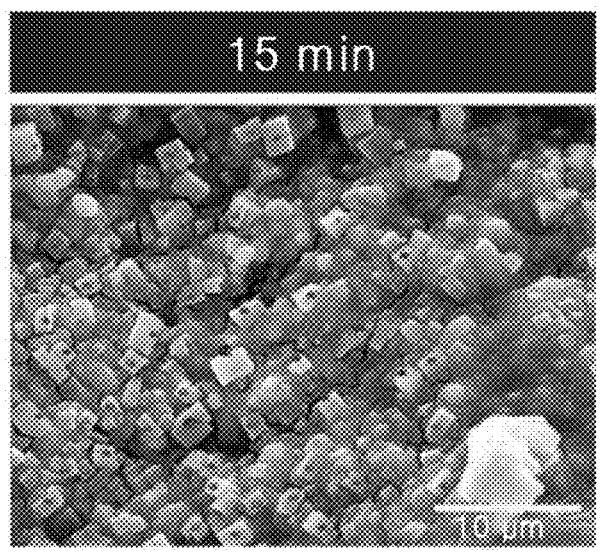

FIGS. 4A to 4C show images of apatite crystals and graphs of crystal sizes of apatite generated according to an embodiment and a comparative example, respectively. FIG. 4A and FIG. 4B are SEM images of crystals of whitlockite, which is apatite including Mg ions, synthesized by hydrothermal synthesis and grown for 2 weeks, respectively (reference: Jang, Hae Lin, et al. "Phase transformation from hydroxyapatite to the secondary bone mineral, whitlockite." Journal of Materials Chemistry B 3.7 (2015): 1342-1349). FIG. 4C is an SEM image of crystals of whitlockite, which is apatite including Mg ions, formed by laser irradiation.

Figure 5A:
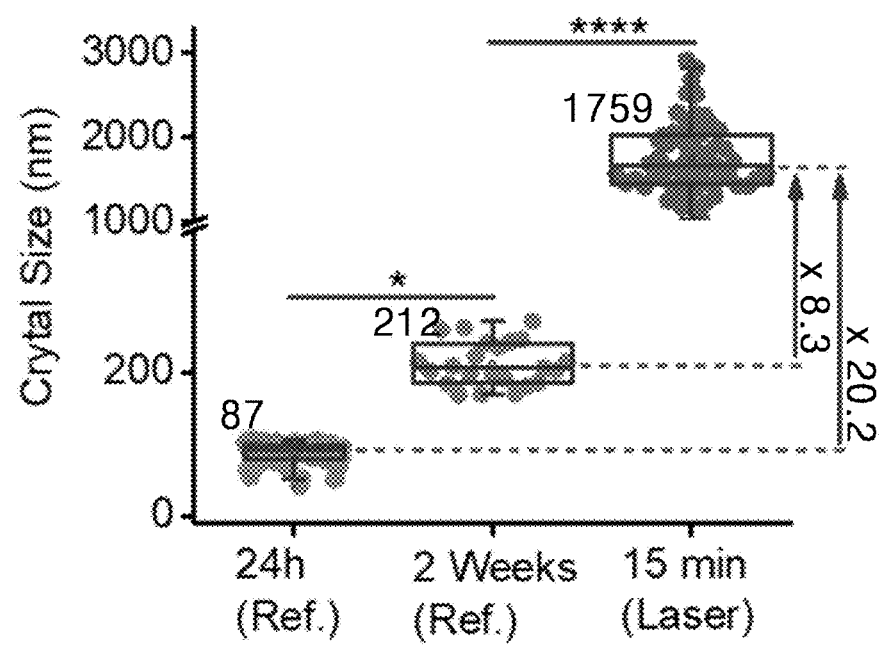
FIG. 5A shows a graph illustrating crystal sizes of apatite generated according to an embodiment and a comparative example.
Figure 5B:
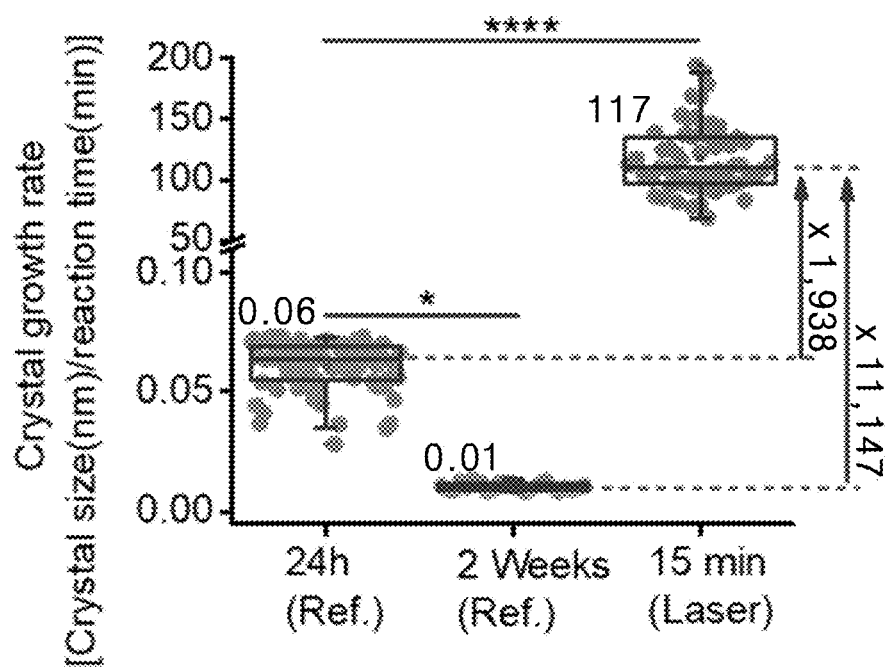
FIG. 5B shows a graph illustrating crystal growth rates of apatite generated according to an embodiment and a comparative example.

In FIG. 5A, although the crystal size of whitlockite synthesized by hydrothermal synthesis was about 87 nm and increased to about 212 nm after 2 weeks of growth, whitlockite synthesized within 15 minutes using the laser had a crystal size of about 1759 nm indicating that it is possible to form about 8 times to 20 times larger crystals. FIG. 5B shows 'crystal growth rate (growth rate)' obtained by dividing crystal size by reaction time and indicates that the crystal growth rate obtained by using a laser is about 11147 times faster than the crystal growth rate obtained by hydrothermal synthesis.

Figure 6A:
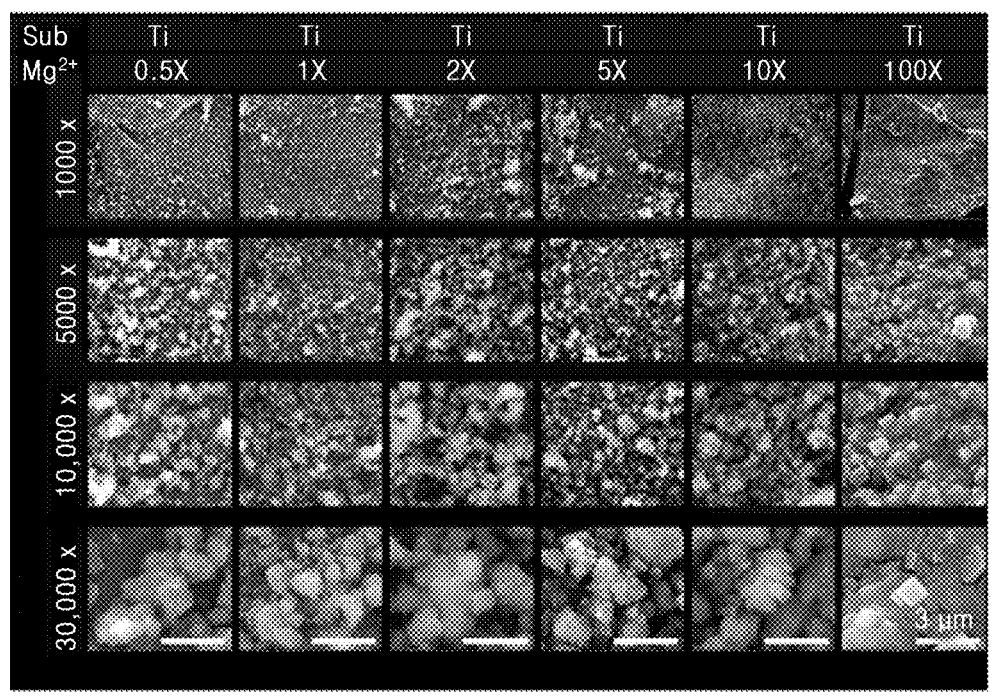
FIG. 6A shows SEM images of Mg-containing crystals generated according to an embodiment and a comparative example.
Figure 6B:
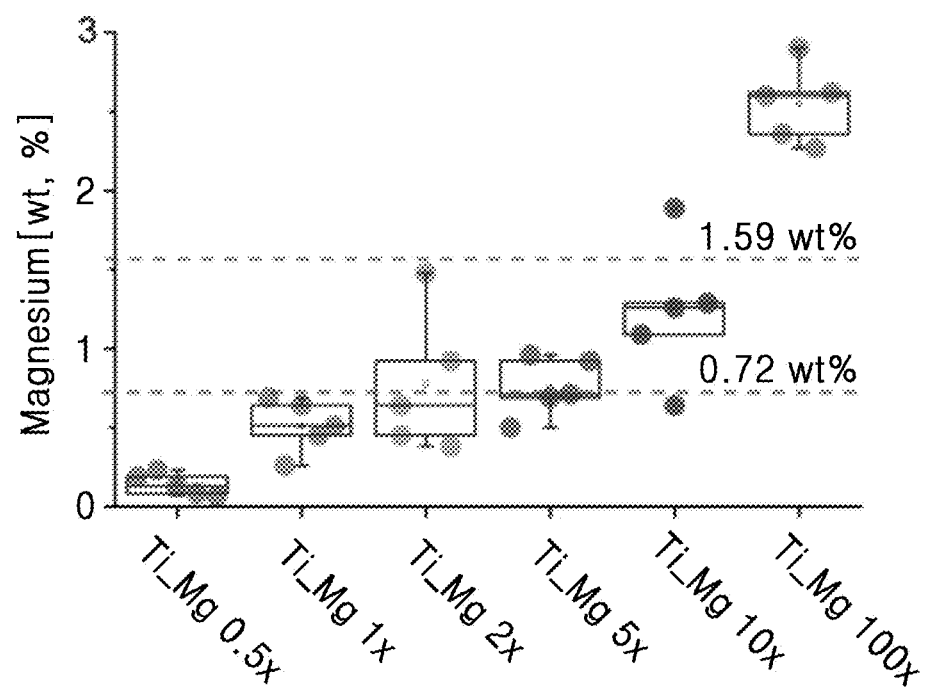
FIG. 6B shows results of Mg content analysis of Mg-containing crystals generated according to an embodiment and a comparative example.

FIG. 6A and FIG. 6B show SEM images of crystals of generated Mg-containing apatite and results of Mg content analysis, respectively. This indicates that components of synthesized powder may be adjusted by controlling ionic components of a reaction solution.

Figure 7A:
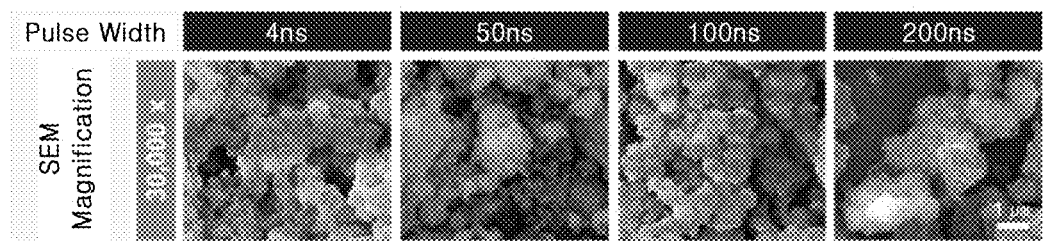
FIG. 7A shows SEM images of apatite according to pulse width according to an embodiment.
Figure 7B:
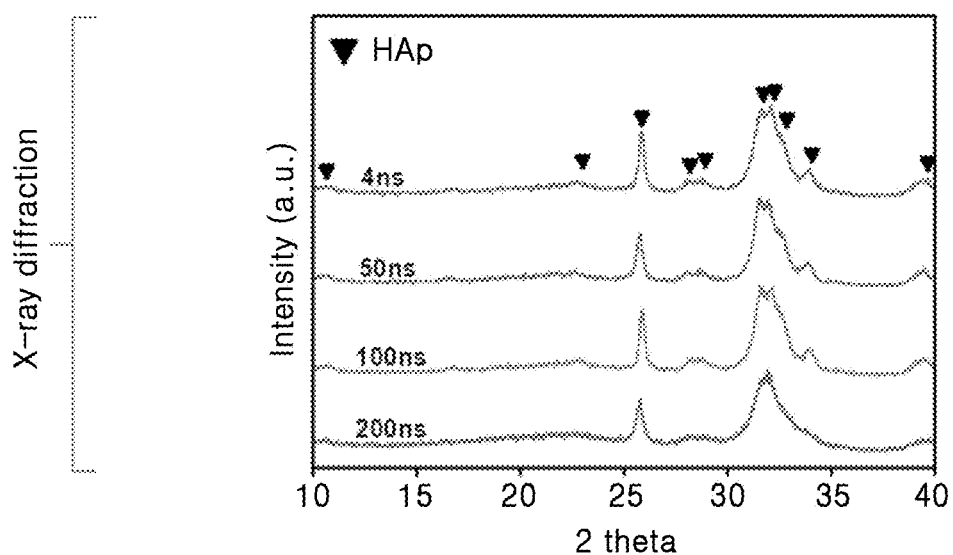
FIG. 7B shows XRD measurement results of apatite according to pulse width according to an embodiment.

FIG. 7A and FIG. 7B show SEM images and XRD measurement results of apatite according to an embodiment, respectively. As a result of phase analysis of the powder synthesized according to changes in the pulse width, pure hydroxyapatite phase was observed under all laser irradiation conditions. This indicates that stable synthesis of powder is possible without phase change regardless of changes in laser pulse width.

Figure 8A:
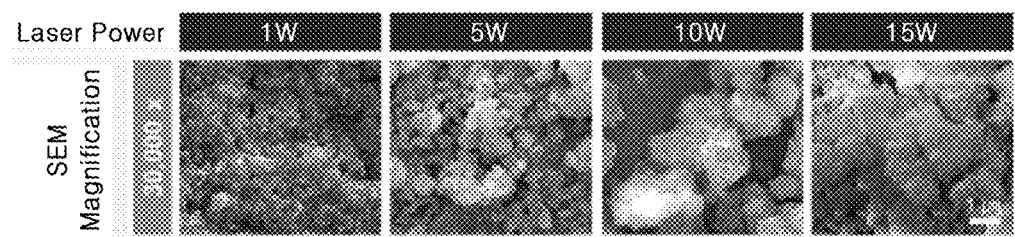
FIG. 8A shows SEM images of apatite according to power of laser beams according to an embodiment.
Figure 8B:
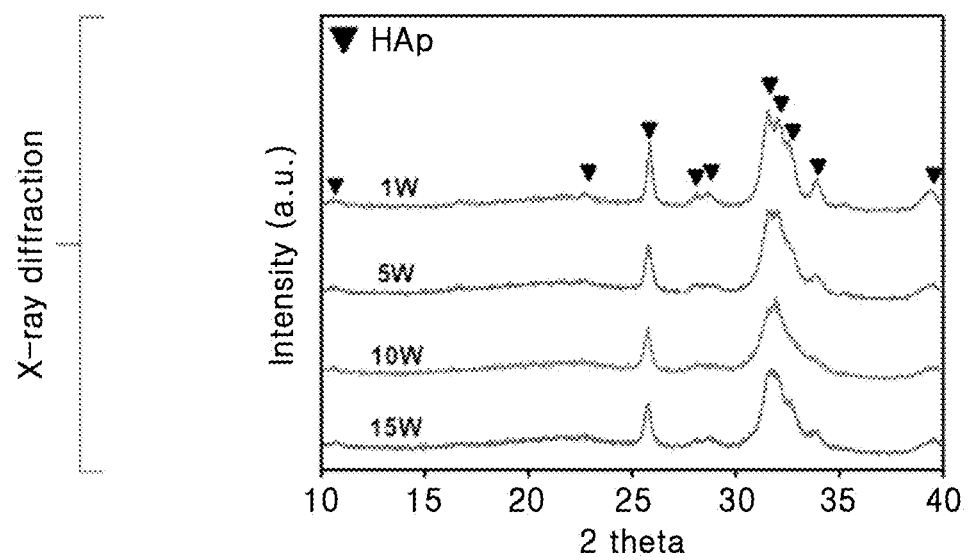
FIG. 8B shows XRD measurement results of apatite according to power of laser beams according to an embodiment.

FIG. 8A and FIG. 8B show SEM images and XRD measurement results of apatite according to an embodiment, respectively. As a result of phase analysis of the powder synthesized according to changes in power of the laser beam, pure hydroxyapatite phase was observed under all laser irradiation conditions. This indicates that stable synthesis of powder is possible without phase change regardless of changes in power of the laser beam.

Figure 9A:
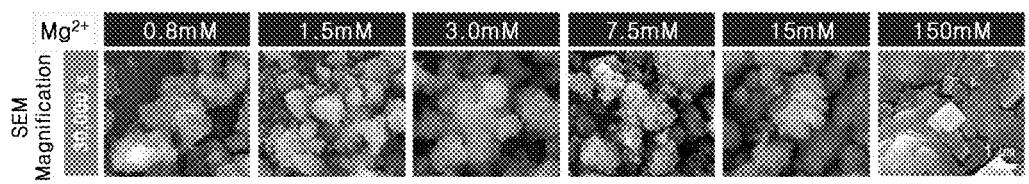
FIG. 9A shows SEM images of apatite synthesized by controlling components of the precursor solution according to an embodiment.
Figure 9B:
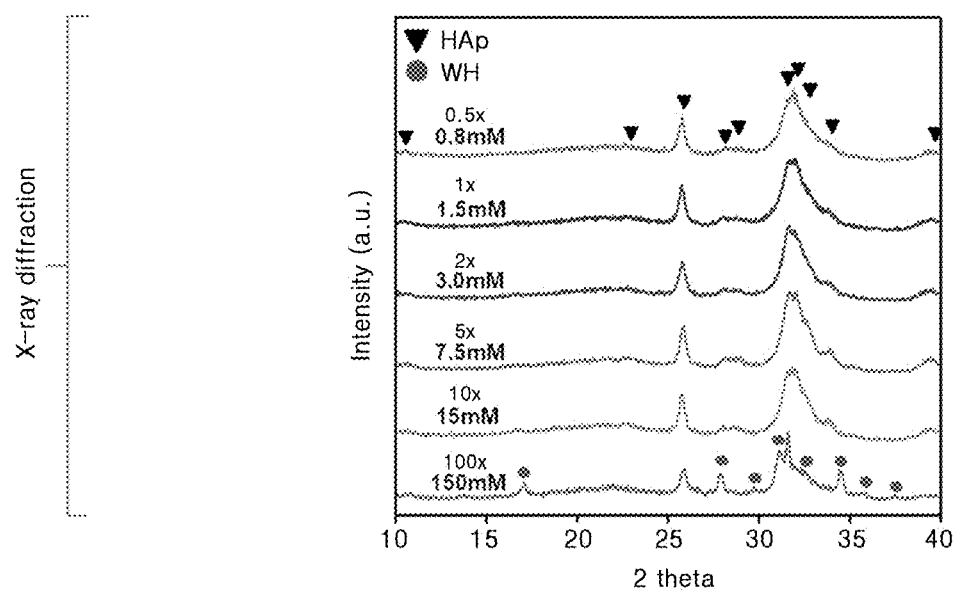
FIG. 9B shows XRD measurement results of apatite synthesized by controlling components of the precursor solution according to an embodiment.

FIG. 9A and FIG. 9B show SEM images and XRD measurement results of apatite according to an embodiment, respectively. This indicates that powders of pure hydroxyapatite, Mg-containing apatite, and whitlockite phase apatite may be synthesized by controlling components of the precursor solution.

Figure 10:
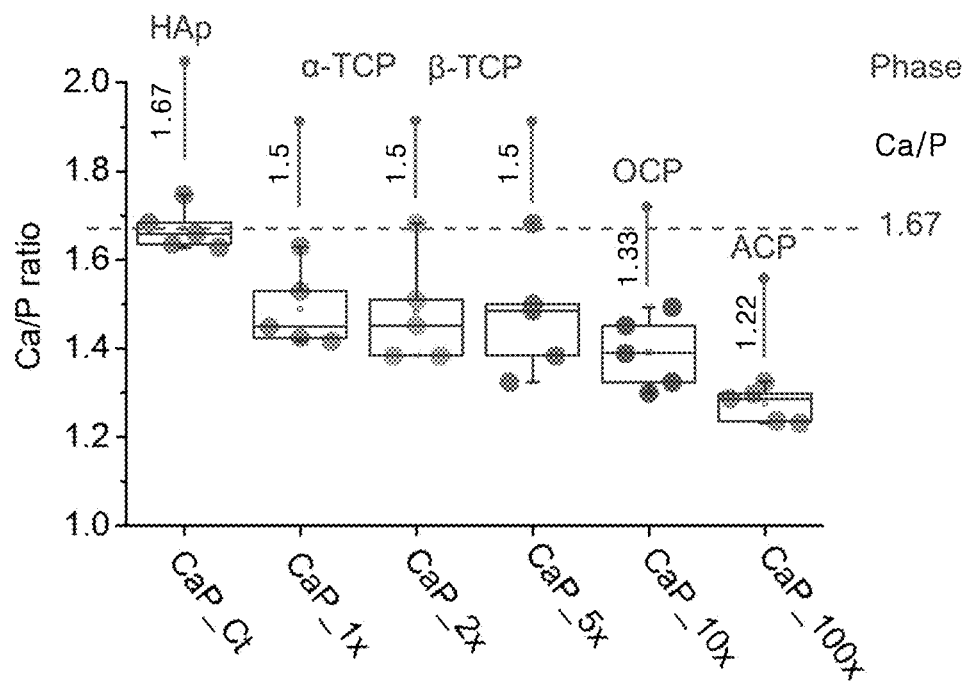
FIG. 10 shows EDS measurement results after generating apatite according to an embodiment.

FIG. 10 shows EDS measurement results after generating apatite according to an embodiment. Ratios of Ca to P contained in the powder synthesized using the precursor solution with controlled components are shown indicating that it is possible to synthesize powder in which the Ca/P ratio is adjusted.

Figure 11A:
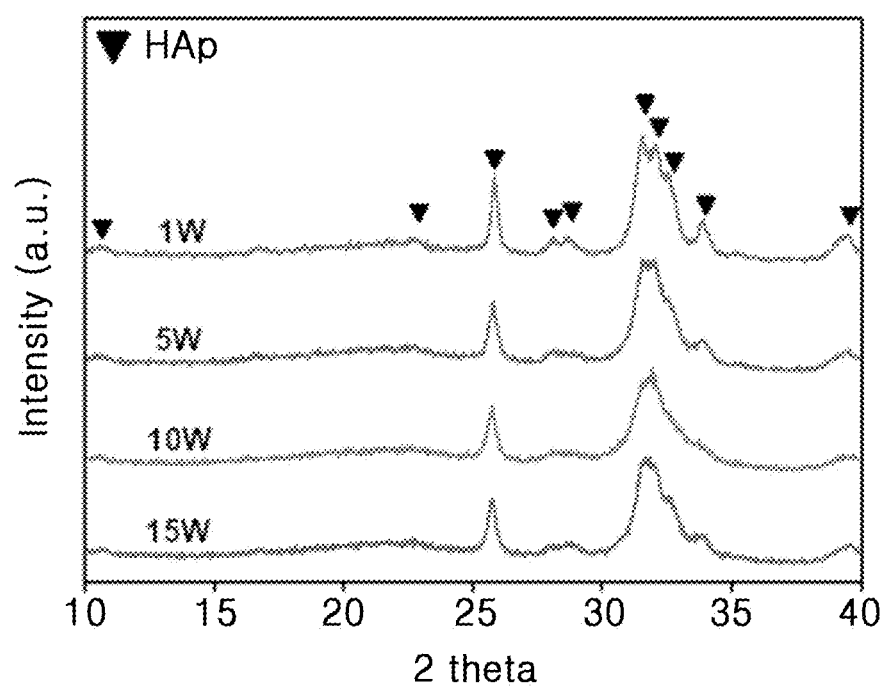
FIG. 11A shows XRD analysis results of apatite powder synthesized by controlling power of a laser beam according to an embodiment.
Figure 11B:
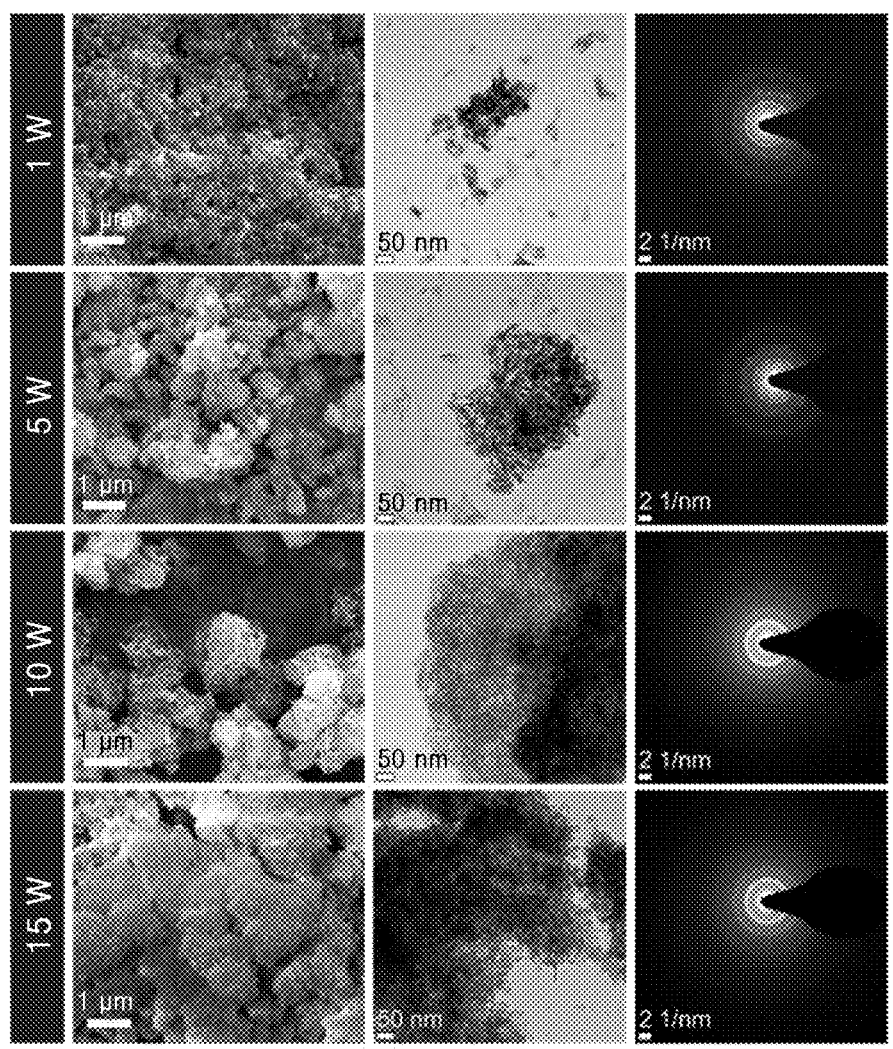
FIG. 11B shows electron microscope images of apatite powder synthesized by controlling power of a laser beam according to an embodiment.

FIG. 11A and FIG. 11B show crystallinity changes of synthesized powder according to laser power in apatite powder synthesis using a laser. FIG. 11A shows XRD measurement results of apatite powder indicating that the peak has a thinner and higher peak as the crystallinity increases. At a laser power of 1 W, a relatively higher crystallinity is shown. FIG. 11B shows SEM, TEM, and TEM-SAD images of apatite powder. As the crystallinity increases, powder is shown in a white dot shape in the TEM-SAD image and a relatively higher crystallinity is observed at a laser power of 1 W.

Figure 12A:
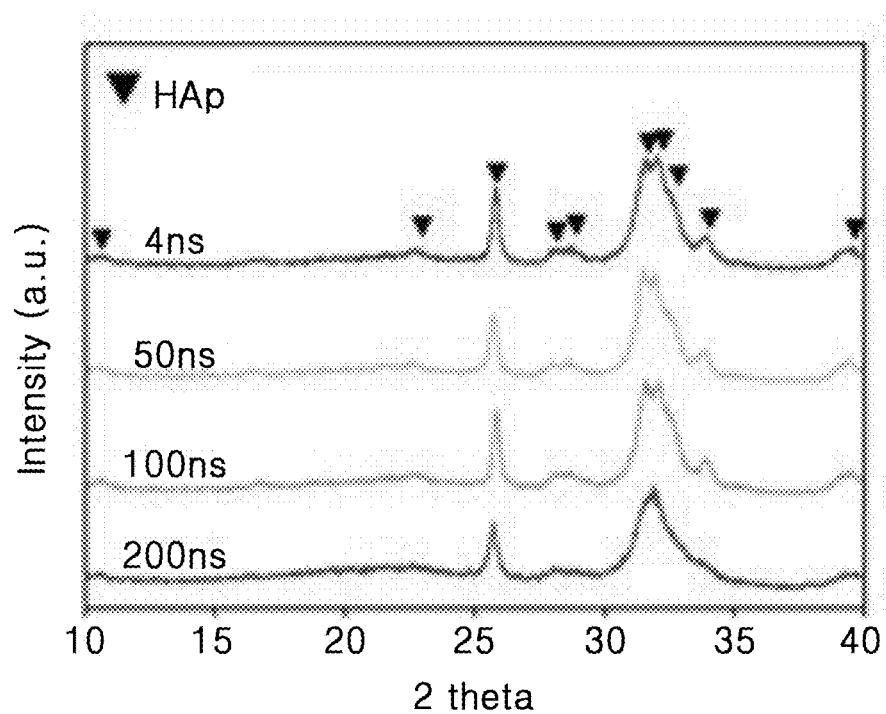
FIG. 12A shows XRD analysis results of apatite powder synthesized by controlling pulse width of a laser beam according to an embodiment.
Figure 12B:
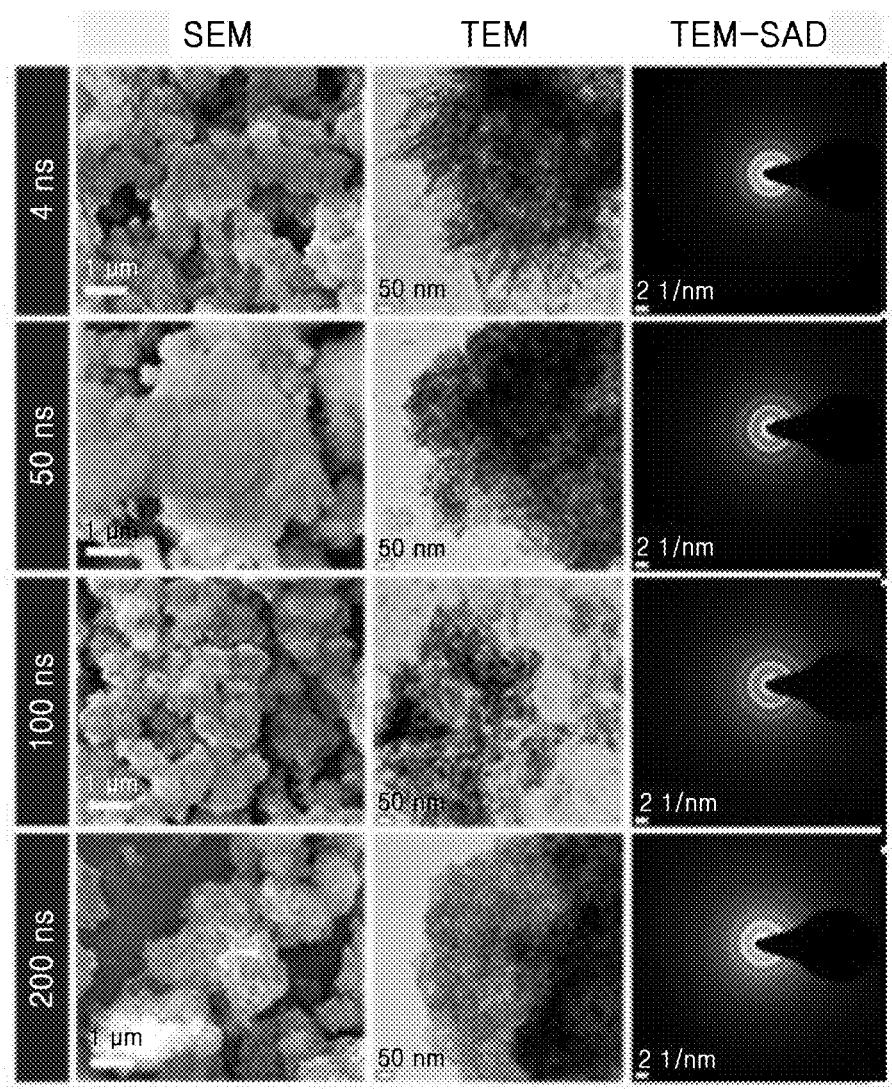
FIG. 12B shows electron microscope images of apatite powder synthesized by controlling pulse width of a laser beam according to an embodiment.

FIG. 12A and FIG. 12B show crystallinity changes of synthesized powder according to pulse width of a laser in apatite powder synthesis using a laser. Referring to FIG. 12A and FIG. 12B, a relatively high crystallinity was observed at a pulse width of 4 ns and a relatively low crystallinity was observed at a pulse width of 200 ns.

Summarizing the results of FIGS. 11 and 12, the crystallinity of synthesized apatite powder may be adjusted by changing the power or pulse width of the laser.

According to the method of an embodiment of the present invention as described above, apatite powder is generated simultaneously with the apatite coating film, and products with various sizes and shapes may be manufactured using the powder afterward, thereby improving the degree of utilization.

According to an embodiment of the present invention as described above, apatite powder with controlled components and size may be synthesized by emitting a laser beam to the surface of the substrate immersed in the precursor solution.

However, these problems to be solved are illustrative and the scope of the present invention is not limited thereby.

While one or more embodiments of the present invention have been described with reference to the drawings, it will be understood by those of ordinary skill in the art that various changes in form and details may be made therein without departing from the spirit and scope of the present invention as defined by the following claims.

What is claimed is:

1. A method of synthesizing apatite powder using a laser, the method comprising:
   (a) immersing a substrate in an apatite-forming precursor solution;
   (b) emitting a laser beam to a region on the substrate immersed in the precursor solution; and
   (c) separating and drying apatite powder generated in the precursor solution,
   wherein an apatite coating film is formed on the substrate and the apatite powder is generated in the precursor solution in the step (b),
   wherein apatite powder is represented by Formula 1 below:

$$(M_1)_a(M_2)_{10-a}(ZO_4)_6(X)_2 \qquad \text{Formula 1}$$

wherein $M_1$ and $M_2$ are each independently selected from the group consisting of $Ca^{2+}$, $Pb^{2+}$, $Sr^{2+}$, $Mg^{2+}$, $Fe^{2+}$, $Mn^{2+}$, $Cd^{2+}$, $Ba^{2+}$, $Co^{2+}$, $Ni^{2+}$, $Cu^{2+}$, $Zn^{2+}$, $Sn^{2+}$, $Eu^{2+}$, $Na^+$, $K^+$, $Li^+$, $Rb^+$, $NH_4^+$, $La^{3+}$, $Ce^{3+}$, $Sm^{3+}$, $Eu^{3+}$, $Y^{3+}$, $Bi^{3+}$, $Cr^{3+}$, $Th^{4+}$, $U^{4+}$, and $U^{6+}$, $ZO_4$ is selected from the group consisting of $PO_4^{3-}$, $ASO_4^{3-}$, $SiO_4^{4-}$, $VO_4^{3-}$, $CrO_4^{3-}$, $CrO_4^{2-}$, $MnO_4^{-3}$, $SO_4^{2-}$, $SeO_4^{2-}$, $BeF_4^{2-}$, $GeO_4^{4-}$, $ReO_5^{3-}$, $SbO_3F^{4}$, $SiON^{5-}$, $BO_4^{5-}$, $BO_3^{3-}$, and $CO_3^{2-}$, X is selected from the group consisting of $F^-$, $OH^-$, $Cl^-$, $O_2^-$, $O_3^-$, $NCO^-$, $BO_2^-$, $Br^-$, $I^-$, $NO_2^-$, $NO_3^-$, $CO_3^-$, $O_2^{2-}$, $NCN^{2-}$, and $NO_2^{2-}$, and a is a real number from 0 to 10.

2. The method of claim 1, wherein the precursor solution is a solution in which $M_1$, $M_2$, and $ZO_4$ ions are dissolved in the step (a).

3. The method of claim 1, wherein when the precursor solution comprises $Ca^{2+}$ ions and $PO_4^{3-}$ ions, hydroxyapatite powder is formed in the step (c).

4. The method of claim 1, wherein when the precursor solution comprises $Mg^{2+}$ ions, powder of one of hydroxyapatite, Mg-containing apatite, whitlockite, and any combination thereof is formed in the step (c).

5. The method of claim 1, wherein a size of the apatite powder is adjusted by controlling a concentration of the precursor solution.

6. The method of claim 1, wherein the step (b) comprises adjusting a size of the generated apatite powder by controlling a laser irradiation time.

7. The method of claim 1, wherein the step (b) comprises adjusting a size of the generated apatite powder by controlling a power of the laser beam.

8. The method of claim 1, wherein components of the apatite powder are adjusted by controlling components of the precursor solution.

9. The method of claim 1, wherein a $(M_1+M_2)/ZO_4$ ratio of the apatite powder is adjusted by controlling a concentration of the precursor solution.

10. The method of claim 1, wherein crystallinity of the apatite powder is adjusted by controlling a power of the laser beam.

11. The method of claim 1, wherein crystallinity of the apatite powder is adjusted by controlling a pulse width of the laser beam.

* * * * *